(12) United States Patent
Saito (10) Patent No.: US 9,409,103 B2
(45) Date of Patent: Aug. 9, 2016

(54) EXTERNAL DEVICE FOR CLEANING FILTRATION MATERIAL AND ADAPTED FOR APPLICATION TO FILTRATION DEVICE

(71) Applicant: NIHON GENRYO CO., LTD., Kanagawa (JP)

(72) Inventor: Yasuhiro Saito, Kanagawa (JP)

(73) Assignee: NIHON GENRYO CO., LTD., Kanagawa (JP)

( * ) Notice: Subject to any disclaimer, the term of this patent is extended or adjusted under 35 U.S.C. 154(b) by 232 days.

(21) Appl. No.: 14/185,387

(22) Filed: Feb. 20, 2014

(65) Prior Publication Data

US 2014/0166594 A1 Jun. 19, 2014

Related U.S. Application Data

(63) Continuation of application No. 12/600,189, filed as application No. PCT/JP2008/001150 on May 7, 2008, now Pat. No. 8,695,613.

(30) Foreign Application Priority Data

May 17, 2007 (JP) ................................. 2007-131774

(51) Int. Cl.
    *B01D 24/46* (2006.01)
    *B01D 41/02* (2006.01)
    *B01D 24/14* (2006.01)

(52) U.S. Cl.
    CPC ............ *B01D 24/4689* (2013.01); *B01D 24/14* (2013.01); *B01D 41/02* (2013.01)

(58) Field of Classification Search
    CPC ........ B01D 23/10; B01D 23/24; B01D 24/14; B01D 24/4631; B01D 24/4636; B01D 24/4689; B01D 41/02
    See application file for complete search history.

(56) References Cited

U.S. PATENT DOCUMENTS 3,333,694 A * 8/1967 Range ................. B01D 24/205
                                                    210/189
4,482,457 A    11/1984 Jacquet
(Continued)

FOREIGN PATENT DOCUMENTS

CN          1615170       5/2005
DE          539 266 C     11/1931
(Continued)

OTHER PUBLICATIONS

UAE Office Action, First Rejection of the U.S. Appl. No. 10/482,009, dated Jul. 10, 2015.
(Continued)

*Primary Examiner* — Matthew O Savage
(74) *Attorney, Agent, or Firm* — Lucas & Mercanti, LLP (57) ABSTRACT

An external device for cleaning a filtration material is applied to a filtration device for filtering a supplied unfiltered liquid by layers of a filtration material to remove muddiness in the liquid and discharging the cleaned liquid to the outside. The cleaning device has an upstanding outer tube, a screw conveyor rotatably placed in the outer tube and transferring the filtration material upward from the lower rod to the upper end of the outer tube while rub-washing the filtration material, a drive section for rotationally driving the screw conveyor, a control section for controlling rotation of the drive section, and a discharge tube for discharging the filtration material having been rub-washed, into a filtration container from the inside of the outer tube and an introduction tube that introduces the filtration material into the outer tube.

4 Claims, 7 Drawing Sheets

(56) References Cited

U.S. PATENT DOCUMENTS

| | | | |
|---|---|---|---|
| 4,787,987 | A | 11/1988 | Hensley |
| 4,818,419 | A | 4/1989 | Mims |
| 5,112,504 | A | 5/1992 | Johnson |
| 6,780,312 | B2 | 8/2004 | Saito |
| 7,160,452 | B2 | 1/2007 | Saito |
| 2004/0262211 | A1 | 12/2004 | Saito |

FOREIGN PATENT DOCUMENTS

| | | | |
|---|---|---|---|
| EP | 1457244 | | 9/2004 |
| GB | 9668 | A | 0/1913 |
| JP | 56-11932 | | 3/1981 |
| JP | 58-1983-501271 | | 8/1983 |
| JP | 60-112304 | U | 7/1985 |
| JP | 02214511 | | 8/1990 |
| JP | 8-066604 | A | 3/1996 |
| JP | 11-334842 | A | 12/1999 |
| JP | 2004-121885 | A | 4/2004 |
| KR | 10-0543150 | | 1/2006 |
| KR | 10-06488424 | | 11/2006 |
| WO | 91/08818 | A1 | 8/1991 |

OTHER PUBLICATIONS

English Translation of UAE Office Action.

English language Translation of JP 60-112304U to Hayashi et al made by Schreiber Translation, Inc. for the USPTO in Mar. 2013.

Korean Office Action (Notice of Provisional Rejection) dated Dec. 30, 2014 for corresponding Korean Application No. 10-2014-7001900 and English translation thereof.

Office Action issued Mar. 30, 2015 for the corresponding Chinese Patent Application No. 201310110339.2.

English translation of Office Action issued Mar. 30, 2015 for the corresponding Chinese Patent Application No. 201310110339.2.

Korean Office Action for Korean Patent Application No. 10-2009-7024935 and an English translation thereof, Mar. 2014.

Canadian Office Action for Canadian Patent Application No. 2,687,519, Apr. 2014.

Korean Office Action for Korean Patent Application No. 10-2014-7001900 and an English translation thereof, Apr. 2014.

European Office Action for European Patent Application No. 13 159 933.4, May 2014.

* cited by examiner

FIG.9

EXTERNAL DEVICE FOR CLEANING FILTRATION MATERIAL AND ADAPTED FOR APPLICATION TO FILTRATION DEVICE

CROSS REFERENCE TO RELATED APPLICATIONS

This is a Continuation of U.S. patent application Ser. No. 12/600,189 filed Feb. 8, 2010, now U.S. Pat. No. 8,695,613, which was a 371 of PCT/JP2008/001150 filed May 7, 2008, which claimed the priority of JP Patent Application No. 2007-131774 filed May 17, 2007, the contents of each of these Applications are incorporated herein by reference.

TECHNICAL FIELD

This invention relates to a device for cleaning a filtration material. This invention particularly relates to an external device for cleaning a filtration, material and adapted for application to a filtration device for removing muddiness in a liquid, such as water, by filtration by use of the filtration material, the external device for cleaning a filtration material being located at the outside of the filtration device.

BACKGROUND ART

In cases where filtration devices are used for a long period of time, filtration sands (filtration materials) within filtration tanks (filtration containers) of the filtration devices are clogged by muddiness in unfiltered liquids, such as water, it becomes impossible to perform efficient filtration, and quality of the liquid having been filtered becomes bad. Therefore, when necessary, the mud substance (muddiness) clinging to the filtration materials is removed, and the clogging of the filtration materials is thereby eliminated. For the aforesaid purposes, it is necessary to perform operations for replacing the filtration materials, or operations for manually taking out the filtration materials from the filtration tank, cleaning the filtration materials for peeling off of the muddiness from the filtration materials, and thereafter again returning the cleaned filtration materials into the filtration tanks. In order for the operations described above to be performed, considerable labor is required, and a space for cleaning the taken-out filtration materials becomes necessary. Also, in cases where the filtration materials are to be scrapped, large quantities of industrial scraps arise. Therefore, there have heretofore been known filtration devices for enabling the aforesaid cleaning operations so be performed automatically without a large space being required.

As an example of a filtration device capable of cleaning a filtration material automatically, there has been known a filtration system, wherein a cleaning mechanism (cleaning device) for a filtration material is located within a filtration tank and is actuated at predetermined time intervals, wherein the filtration material is thereby cleaned, and wherein the muddiness having been peeled off the filtration material is discharged from the filtration tank to the outside (patent literature 1, patent literature 2).

In the filtration system described in the patent literature 1, the cleaning device for cleaning the filtration material by rotation of a screw conveyor is located on a support plate for supporting layers of filtration sand. Also, the filtration system described in the patent literature 2 has a constitution, in which the cleaning device for cleaning the filtration material by the rotation of a screw conveyor is hung from an upper section of the filtration tank into the inside of she filtration tank.

Further, there has been known a filtration sand cleaning system, in which a cleaning device is located at the outside of a filtration tank, in lieu of being located at the inside of the filtration tank (patent literature 3). In the cases of the filtration sand cleaning system, there are disclosed a filtration container provided with a filtration material, a pump for sucking out the filtration material from the filtration container, and the filtration material cleaning device for cleaning the filtration material having been sucked out from the filtration container. In the cases of the cleaning system, the pump is connected to the filtration tank and the filtration material cleaning device respectively by pipes. The filtration system is constituted such that the filtration sand containing the muddiness is transferred into the cleaning device, water it supplied by the pump into the cleaning device, and the filtration material from which the muddiness has been removed is returned into the filtration tank. Also, the muddiness having been removed is sucked up by a pump from the upper section of the cleaning device and discharged to the outside through piping connected to the cleaning device.

Patent literature 1:
  PCT International Publication No. WO 01/83076
  (FIG. 6)
Patent literature 2:
  Japanese Unexamined Patent Publication No. 2004-160432
  (FIG. 1)
Patent literature 3:
  U.S. Pat. No. 5,112,504
  (FIG. 1)

DISCLOSURE OF INVENTION

Problems to be Solved by the Invention

In cases where the user using an existing filtration tank, which is not provided with a cleaning device, intends to clean filtration sand easily with a little labor, it is necessary for the entire existing device to be replaced by a newly purchased filtration device provided with the cleaning device as disclosed in patent literature 1 or patent literature 2. In such cases, the problems are encountered in that the cost is not capable of being kept low.

The filtration system disclosed in patent literature 3 has time problems in that the filtration system has a complicated shape requiring a large number of piping lines and pumps, and in that the operation for cleaning the filtration material is not of the type for positively cleaning the filtration material.

In view of the above circumstances, the object of the present invention is to provide an external device for cleaning a filtration material and adapted for application to a filtration device, wherein the filtration material is capable of being cleaned easily and at a low cost without requiring replacement of an existing filtration device, which does not have a cleaning device, with a newly purchased filtration device.

Means for Solving the Problems

The present invention provides an external device for cleaning a filtration material and adapted for application to a filtration device, which filtration device is provided with a filtration container having layers of a filtration material at the inside and is adapted for filtering a supplied unfiltered liquid by the layers of the filtration material to remove muddiness in the liquid and discharging the cleaned liquid to the outside, the cleaning device comprising:

i) an upstanding outer tube, ii) a screw conveyor rotatably placed in the outer tube and transferring the filtration material upward from an inlet at a lower end section of the outer tube to an outlet at an upper end section of the outer tube, while rub-washing the filtration material, iii) a drive section for rotationally driving the screw conveyor, iv) a control section for controlling rotation of the drive section, v) an introduction tube, which is connected to the inlet of the outer tube and introduces the filtration. material from the inside of the filtration container into the outer tube by only suction force generated by the rotation of a screw of the screw converyer, and vi) a discharge tube, which is connected to the outlet of the outer tube and discharges the filtration material, having been rub-washed, from the inside of the outer tube into the filtration container by only discharge force generated by rotation of the screw of the screw conveyer.

The term "external device for cleaning a filtration material and adapted for application to a filtration device" as used herein means the cleaning device capable of being fitted as a post-installed device to the existing filtration device and embraces both the cleaning device, which is fitted and used only at the time of the cleaning operation, and the cleaning device, which is installed ordinarily and operated only at the time of the cleaning operation.

The cleaning device in accordance with the present invention may be modified such that the screw conveyor is provided with an agitating blade for agitating the introduced filtration material, which agitating blade is located at a lower end of the screw conveyor.

Also, the cleaning device in accordance with the present invention may be modified such that the lower end section of the outer tube, which lower end section is located at a position corresponding to the position of the agitating blade, is constituted as a large diameter section.

Further, the cleaning device in accordance with the present invention should preferably be modified such that the screw conveyor is provided with a hollow shaft and a spiral blade, which is formed in a spiral pattern around the hollow shaft, and the hollow shut has holes which enable the liquid having been introduced into the outer tube to flow from the outside of the hollow shaft into the inside of the hollow shaft.

A plurality of the holes should preferably be formed at a region of the hollow shaft, which region ranges upward from approximately the middle part of the outer tube, the middle part being taken with respect to the vertical direction. Also, the plurality of the holes should preferably be formed at intervals of 45° along a circumferential direction of the hollow shaft. Further, a gap between an outer periphery of the spiral blade and an inner surface of the outer tube should preferably be slightly larger than a particle diameter of the filtration material. Furthermore, the spiral blade of the screw conveyor should preferably extend in a continuous surface pattern from the hollow shaft to a position in the vicinity of the inner surface of the outer tube. Also, the holes should preferably be located at positions just above the spiral blade.

Effects of the Invention

The external device for cleaning a filtration material and adapted for application to a filtration device in accordance with the present invention comprises: the screw conveyor rotatably placed in the outer tube and transfer ring the filtration material upward from the inlet at the lower end section of the outer tube to the outlet at the upper end section of the outer tube, while rub-washing tine filtration material, the drive section for rotationally driving the screw conveyor, the control section for controlling rotation of the drive section, and the introduction tube and the discharge tube, which tubes are connected to the outer tube. Therefore, in cases where the user of an existing filtration device, which is not provided with a cleaning device, purchases only the cleaning device in accordance with the present invention and connects the introduction tube and the discharge tube to the filtration device, the user is capable of automatically cleaning the filtration material easily and at a low cost. Also, the external device for cleaning a filtration material in accordance with the present invention is capable of being used without necessity of modification of the existing filtration device or with fine minimum necessary work being performed on tine filtration device.

Further, with the cleaning device in accordance with the present invention, wherein the screw conveyor is provided with the agitating blade for agitating the introduced filtration material, which agitating blade is located at the lower end of the screw conveyor, in cases where the liquid (reverse cleaning liquid) containing the filtration material having been introduced into the introduction tube has a high concentration, i.e. a high viscosity, the filtration material is loosened by the agitation and is capable of being transferred smoothly by the screw conveyor. Since the concentration of the reverse cleaning liquid is high at the time of the beginning of the reverse cleaning operation, the agitating blade is particularly useful.

Furthermore, with the cleaning device in accordance with the present invention, wherein the lower end section of the outer tube, which lower end section is located at fine position corresponding to the position of the agitating blade, is constituted as the large diameter section, the filtration material having been agitated by the agitating blade is diffused broadly at the lower end section of the outer tube, at which lower end section the clogging is ordinarily apt to occur. Therefore, the state of the high concentration (high viscosity) is eliminated tore efficiently, and the filtration, material is capable of being transferred more smoothly by the screw conveyor.

Also, with the cleaning device in accordance with the present invention, wherein the hollow shaft of the screw conveyor, which hollow shaft has the spiral blade having been formed in the spiral pattern around the hollow shaft, has the holes which enable the liquid having been introduced into the outer tube to flow from the outside of the hollow shaft into the inside of the hollow shaft, the liquid (the reverse cleaning liquid) transferred together with the filtration material upward from the hollow shaft flows through the holes downward into the inside of the hollow shaft. Therefore, the filtration material having been drained is capable of being efficiently transferred upward. If the quantity of water is markedly large, there is the risk that the filtration material will be merely transferred upward together with water, and the rub-washing will not be performed sufficiently.

BEST MODE FOR CARRYING OUT THE INVENTION

Figure 1:
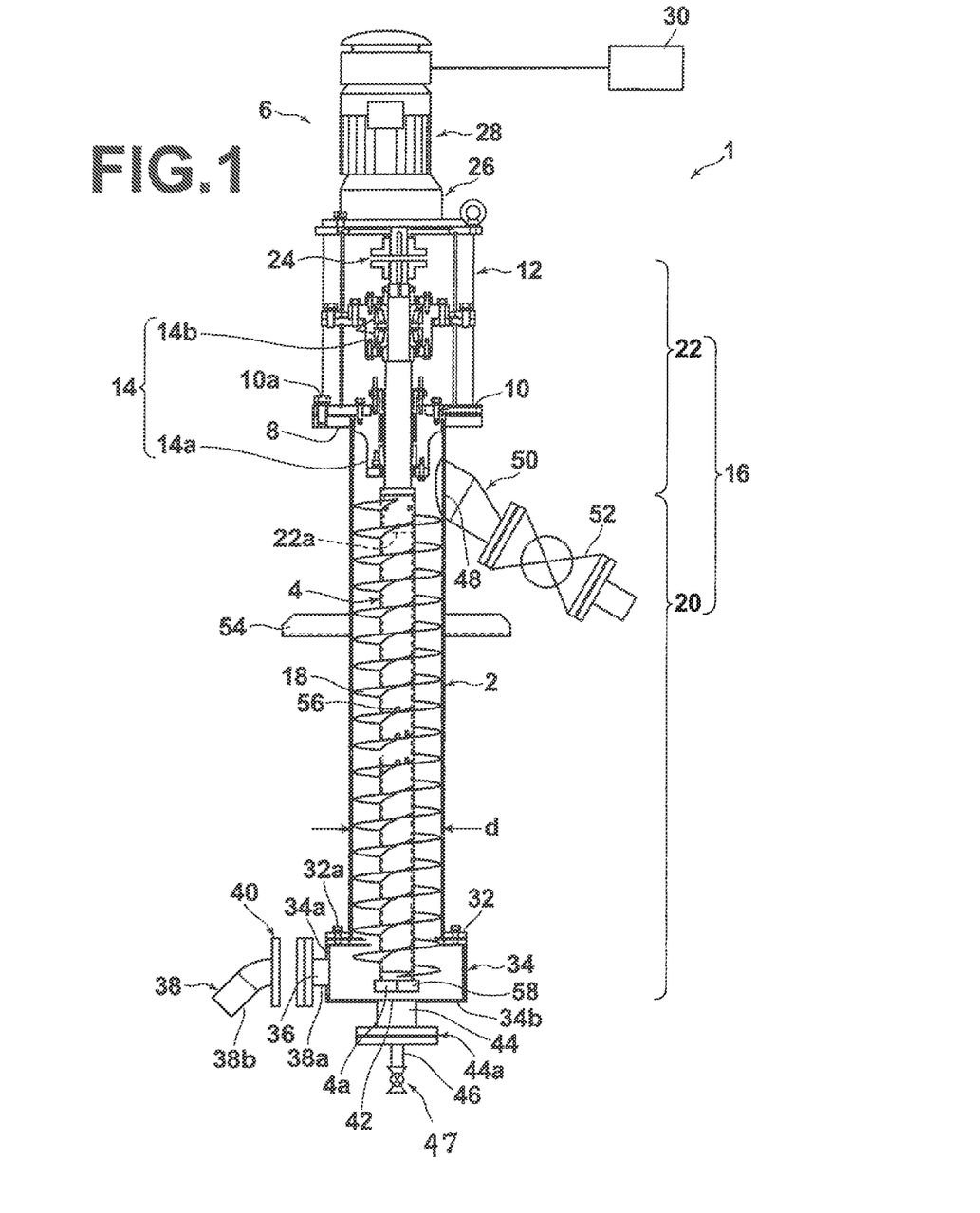
FIG. 1 is a schematic vertical sectional view showing an embodiment of the external device for cleaning a filtration material and adapted for application to a filtration device in accordance with the present invention.
Figure 2:
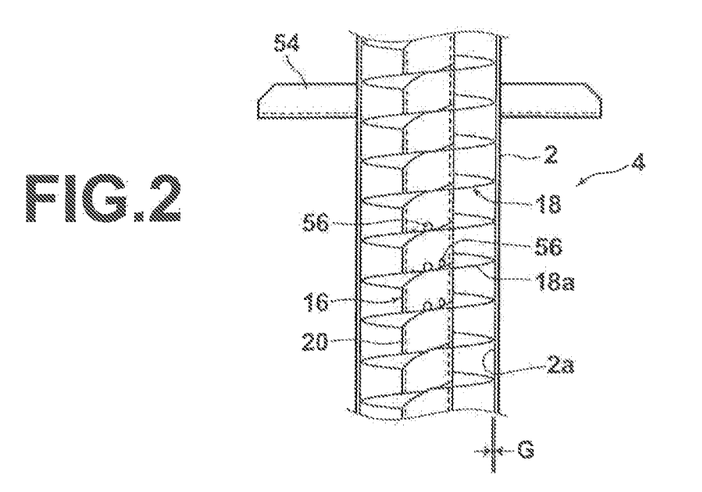
FIG. 2 is an enlarged view showing a part of the external device for cleaning a filtration material and adapted for application to a filtration device illustrated in FIG. 1.
Figure 3A:
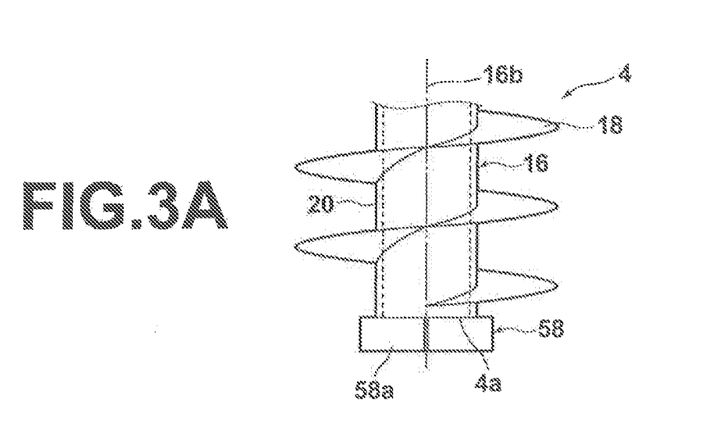
FIG. 3A is an enlarged front view showing a part of the external device for cleaning a filtration material and adapted for application to a filtration device illustrated in FIG. 1.
Figure 3B:
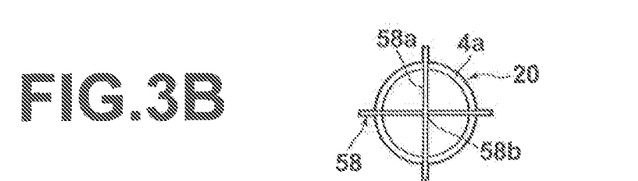
FIG. 3B is an enlarged bottom view showing a part of the external device for cleaning a filtration material and adapted for application to a filtration device illustrated in FIG. 1.

The external device for cleaning a filtration material and adapted for application to a filtration device in accordance with the present invention (hereinbelow referred to simply as the cleaning device) will hereinbelow be described in further detail with reference to the accompanying drawings. FIG. 1 is a schematic vertical sectional view showing an embodiment of the cleaning device in accordance with the present invention. Also, each of FIG. 2 and FIGS. 3A, 3B is an enlarged view showing a part or a cleaning device 1 of FIG. 1. The cleaning device 1 will he described hereinbelow with reference so FIG. 1, FIG. 2, and FIGS. 3A, 3B. Firstly, with reference to FIG. 1, the cleaning device 1 comprises a circular cylindrical outer tube 2 made from a metal, a screw conveyor 4 located within the outer cube 2, and a drive section 6 connected to the upper end of the screw conveyor 4. The outer tube 2 is provided with a flange 8, which is located at the upper end of the outer tube 2. A pedestal 12 provided with a flange 10 corresponding so the flange 8 is located on the flange 8. The flange 8 and the flange 10 are secured to each other by bolts 10a, and the pedestal 12 is thereby secured to the outer tube 2.

The pedestal 12 is provided with a bearing 14 for supporting a shaft 16 of the screw conveyor 4. The bearing 14 is constituted of a bearing 14a, which is located on the side of the flange 10, and a bearing 14b, which is located midway of the height direction of the pedestal 12. The shaft 16 of the screw conveyer 4 comprises a hollow shaft 20, which has a hollow shape, i.e. a pipe-like shape, and which is provided with a spiral blade 18 located within the outer tube 2, and a support shaft section 22, which is located at the position higher than the hollow shaft 20 and has a diameter slightly smaller than the diameter of the hollow shaft 20. The support shaft section 22 is inserted into the hollow shaft 20 and is secured by welding to the hollow shaft 20. The support shaft section 22 is supported by the bearing 14 described above. A coupling 24 is connected to the upper end of the support shaft section 22. The aforesaid drive section 6, which comprises a speed reducing mechanism section 26 and a motor 28 connected to the speed reducing mechanism section 26, is located on the pedestal 12. The motor 28 is electrically connected to a control section 30 for controlling the number of revolutions of the motor 28, which control section may be provided with, for example, an inverter circuit. In this case, the control section 30 is illustrated in a typical form.

Figure 4:
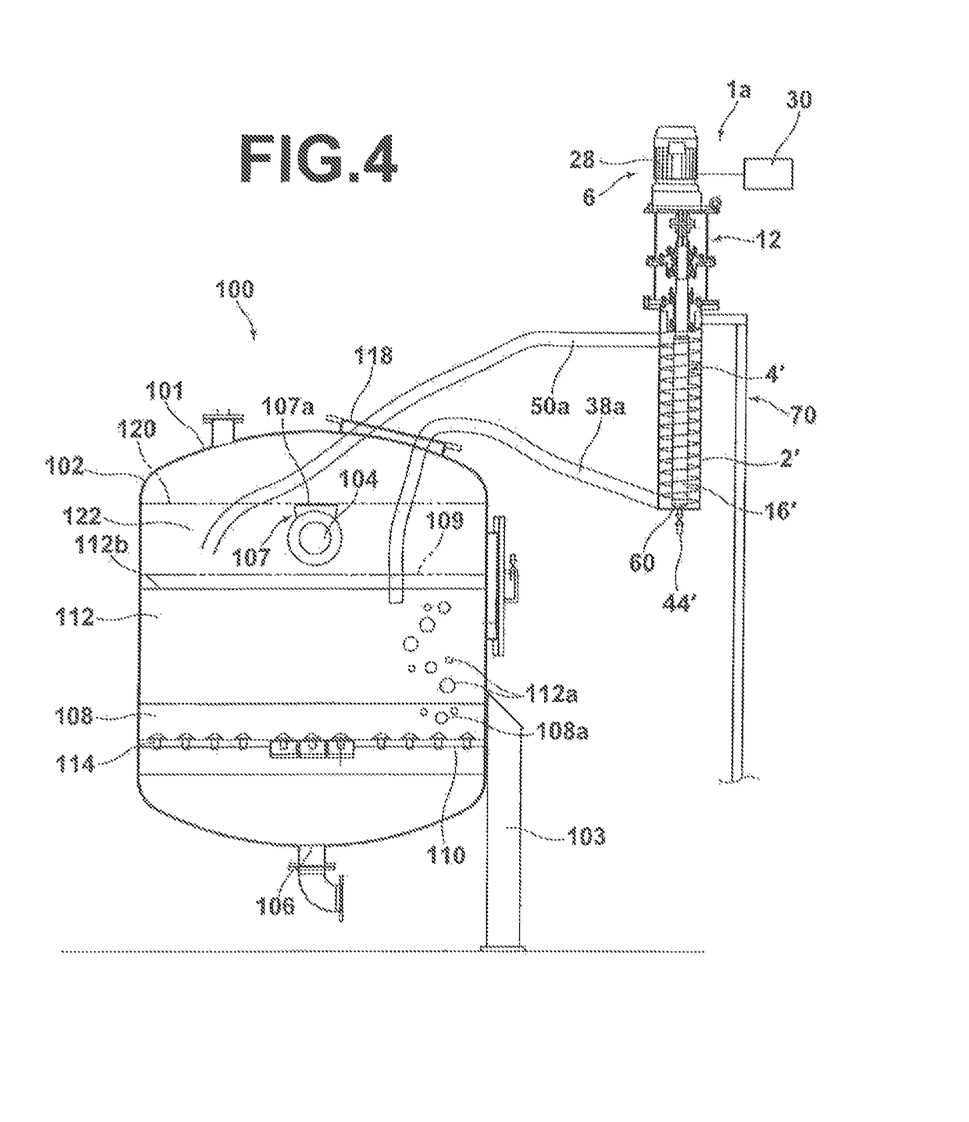
FIG. 4 is a vertical sectional view showing a first application example of a different embodiment of the external device for cleaning a filtration material and adapted for application to a filtration device in accordance with the present invention.

A flange 32 is formed at the lower part of the outer tube 2. A large diameter section 34 is connected by bolts 32a to the flange 32. In other words, the lower part of the outer tube 2 is formed as the large diameter section 34. The large diameter section 34 is a circular cylindrical shaped section having a low height and a diameter larger than a diameter "d" of the outer tube 2. A lower end 4a of the screw conveyor 4 is located within the large diameter section 34. An inlet 36 for introduction of a filtration material 112a (as illustrated in FIG. 4) and a liquid (a reverse cleaning liquid 122 as illustrated in FIG. 4), such as water, is formed at a side surface 34a of the large diameter section 34. An introduction tube 38 is fitted by welding to the inlet 36. In this embodiment, as illustrated in FIG. 1, the introduction tube 38 may be a tube connected with a tube or a hose having an arbitrary shape via a flange 40 into an integral body. Alternatively, a single long tube, which is not provided with the flange 40, may be employed as the introduction tube 38. Also, the introduction tube 38 may be made from a metal, a synthetic resin, rubber, or the like.

Also, an injection hole 42 is formed through a bottom wall 34b of the large diameter section 34. An injection pipe 44 is connected to the injection hole 42. The injection tube 44 is connected through a flange 44a to a small diameter pipe 46. A ball valve 47 is fitted to the pipe 46. At the time of an ordinary state, the ball valve 47 is closed. When necessary, the ball valve 47 is opened, and water, or the like, is supplied into the outer tube 2. In cases where the reverse cleaning liquid 122, i.e., a slurry, which contains the filtration material 112a and the muddiness and which has been introduced from the introduction tube 38, has a high concentration, the injection tube 44 is used to dilute the reverse cleaning liquid 122 into a liquid, which is capable of being transferred easily, is used to inject priming water into the outer tube 2.

Further, an outlet 48 for discharging the filtration material 112a is formed at the upper end section of the outer tube 2. A discharge tube 50 is fitted by, for example, welding to the outlet 48. A ball valve 52 is fitted at a position midway of the discharge tube 50. The ball valve 52 need not necessarily be provided in accordance with an application example, which will be described later. Furthermore, a stay 54 for securing the cleaning device 1 to, for example, a mounting support (not shown) is fitted to the outer tube 2 so as to extend laterally outward at a position slightly above a midway part of the outer tube 2, which midway part is taken with respect to the vertical direction.

Also, as described above, the part, of the shaft 16 of the screw conveyor 4, which part extends from the lower end 4a of the hollow shaft 20 to a lower end 22a of the support shaft section 22, the lower end being inserted into the hollow shaft 20, is hollow. The intermediate section of the hollow shaft 20 is provided with a plurality of holes 56. The holes 56 will hereinbelow be described with reference to FIG. 1 and FIG. 2. FIG. 2 is an enlarged sectional view showing a part of the intermediate section of the outer tube 2 of the cleaning device 1. In FIG. 2, as for the screw conveyor 4, the outer shape thereof is illustrated. The spiral blade 18 of the screw conveyor 4 is formed in a spiral pattern on the outer periphery of the hollow shaft 20. The spiral blade 18 does not have through-holes, slots, or the like, and the entire area of the surface of the spiral blade 18 constitutes a screw. Therefore, the spiral blade 18 is capable of efficiently transferring upward the reverse cleaning liquid 122 containing the filtration material 112a.

It is set such that a slight gap G is formed between an outer periphery, i.e. an outer edge 18a, of the spiral blade 18 and an inner surface 2a of the outer tube 2. In cases where the particle diameter of the filtration material 112a falls within the range of, for example, 0.6 mm to 1.0 mm, the dimension of the gap G is set to be slightly larger than the particle diameter. The reasons are as described below. Specifically, at the time at which the filtration material 112a is transferred upward by the screw conveyor 4, the filtration material 112a is moved toward the outer periphery of the spiral blade 18 by centrifugal force arising due to the rotation of the screw conveyor 4. However, the filtration material 112a is prevented by the aforesaid gap G from being squeezed and ground between the outer edge 18a of the spiral blade 18 end the inner surface 2a of the outer tube 2 at the time of the rub-washing. Also, since the filtration material 112a and the peeled-off muddiness exist at the gap G, the degree of sealing between the screw conveyor 4 and the outer tube 2 is enhanced, and the efficiency of transfer of the filtration material 112a and tine reverse cleaning liquid 122 is enhanced.

The aforesaid holes 56 are formed so as to be located just above the fitting section of the spiral blade 18 to the hollow shaft 20. Since the holes 56 are located just above the spiral blade 18, the reverse cleaning liquid 122 stagnating on the spiral blade 18 is capable of smoothly flowing along the spiral blade 18 into the holes 56. The plurality of the holes 56 are formed over two pitches of the spiral blade 18 and at a rate of one hole par 45 degrees along the fitting section. The cleaning device 1 is installed such that the positions of the holes 56 are higher than the level of the reverse cleaning liquid within the filtration tank to be cleaned. Since the inside of the hollow shaft 20 is hollow, a part of the reverse cleaning liquid 122, which is being transferred upward from the holes 56, is capable of flowing into the hollow section. The holes 56 described above have the effects of draining of the reverse cleaning liquid 122 which is transferred. The number of the holes 56 and the intervals of the holes 56 along the circumference of the hollow shaft 20 are not limited to those in the aforesaid embodiment and may be altered appropriately in accordance with the use applications.

The shape of the lower end section of the screw conveyor 4 will be described herein bedew with reference to FIG. 1, FIG. 2, and FIGS. 3A and 3B. FIGS. 3A and 3B are enlarged views showing the lower end section of the screw conveyor 4. FIG. 3A is a front view, and FIG. 3B is a bottom view. As illustrated in FIGS. 3A and 3B, the agitating blade 58 is fitted to the lower end 4a of the hollow shaft 20 of the screw conveyor 4. The agitating blade 56 is constituted of four ribs 58a having an identical length. The ribs 58a are constituted by combining two metal plates, each of which has a length of a dimension larger than the diameter of the hollow shaft 20, in a cross-shaped pattern. Also, the agitating blade 58 is fitted by welding to the lower end 4a of Lee hollow shaft 20, such that the center point of the cross-shaped pattern, i.e. an intersection point 58b of the two metal plates, and a rotation center point 16b of the shaft 16 may coincide with each other. Therefore, the hollow section of the hollow shaft 20 is in communication with the outside.

In cases where the reverse cleaning liquid 122, i.e., the slurry, which contains the filtration material 112a and which has been introduced into the cleaning device 1, has a high concentration, the agitating blade 58 is utilized for agitating the filtration material 112a and thereby preventing the filtration material 112a from stagnating at the lower part in the outer tube 2. Therefore, in cases where the concentration of the liquid is low, the agitating blade 58 need not necessarily be provided. For example, the agitating blade 58 may be merely omitted. Alternatively, the lower end 4a may have a closed shape.

Figure 5:
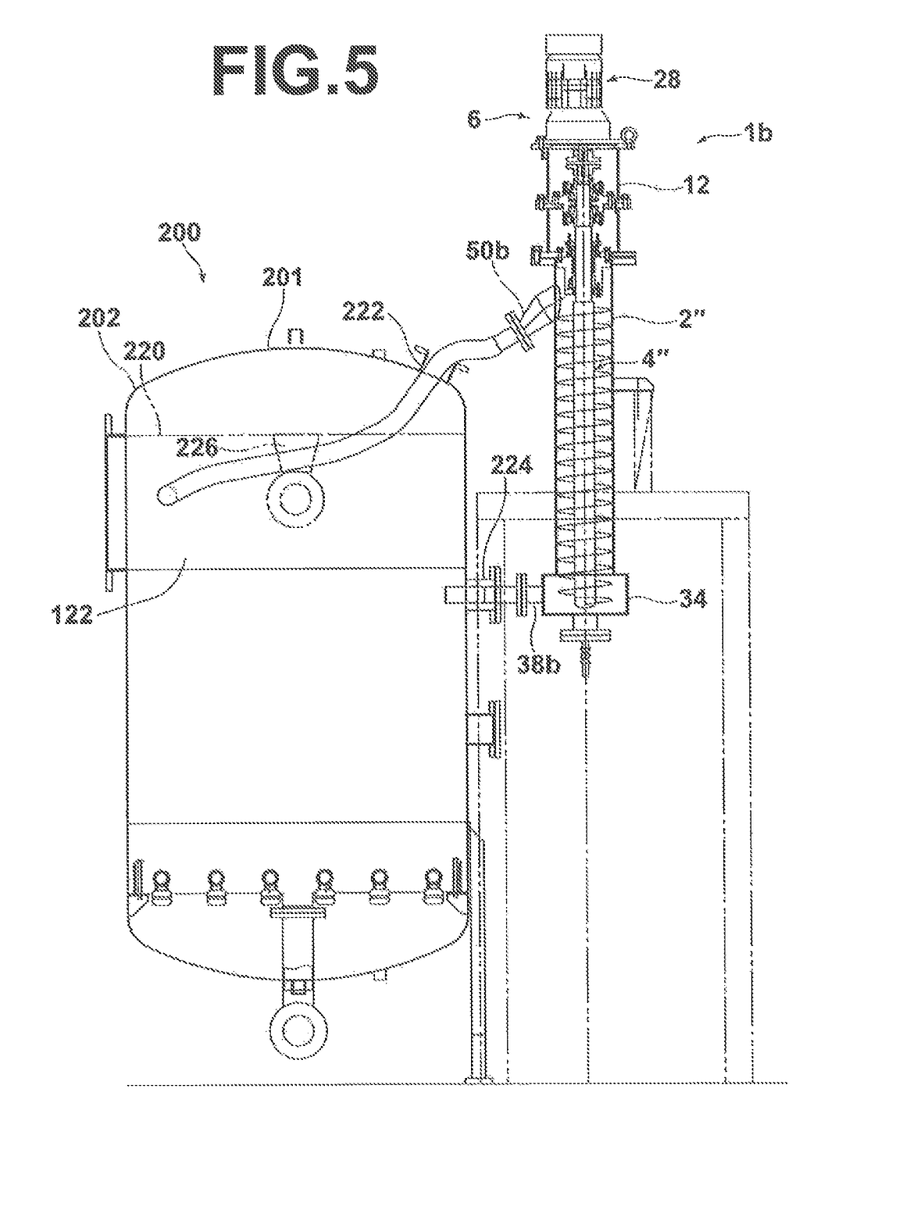
FIG. 5 is a vertical sectional view showing a second application example of a further different embodiment of the external device for cleaning a filtration material and adapted for application to a filtration device in accordance with the present invention.
Figure 6:
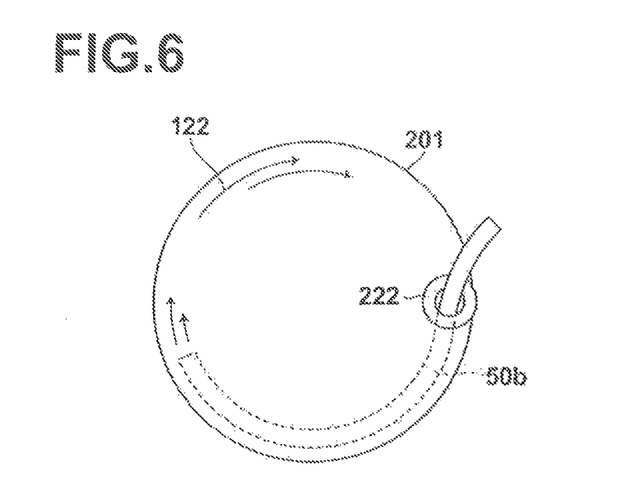
FIG. 6 is a schematic plan view showing a part of the external device for cleaning a filtration material and adapted for application to a filtration device illustrated in FIG. 5.

Application examples, in each of which the cleaning device 1 having been constituted in the manner described above is applied to an existing filtration tank, will be described hereinbelow with references to FIG. 4, FIG. 5, and FIG. 6. The term "filtration device" as used herein means the entire device including the filtration tank and other subsidiary facilities, such as a support leg. FIG. 4 illustrates first application example. FIG. 5 and FIG. 6 illustrate second application example. Firstly, an application example, in which a cleaning device 1a is applied to a filtration tank 101 of a filtration device 100, will be described hereinbelow with reference to FIG. 4. The different embodiment of the cleaning device 1a used in this case has a constitution basically identical with the constitution of the aforesaid cleaning device 1, except for the positions and the shapes of a discharge tube 50a end an introduction tube 33a. Also, the cleaning device 1a is different from the cleaning device 1 of FIG. 1 in that the large diameter section 34 at the lower part of the outer tube 2 and the agitating blade 58 are not provided. At a lower end of a shaft 16' of a screw conveyor 4' of the cleaning device 1a, the opening of the shaft 16' is sealed by, for example, a cap 60. The cleaning device 1a is supported by an appropriate support 70. In FIG. 4, similar parts with respect to the parts in FIG. 1 are explained by use of the same reference number. Also, parts which need not be explained are attached with the reference numbers of principal parts corresponding to the embodiment of FIG. 1, and the explanation of the parts is omitted.

The filtration tank 101 has, as a typical shape, a circular cylindrical outer shell body 102, whose upper section and a lower section are closed respectively by curved convex surfaces. The filtration tank 101 is supported by a support leg 103. An unfiltered water injection port 104 for injection of water containing the muddiness, i.e. the unfiltered water, is formed at an upper part of a side surface of the outer shell body 102. A discharge port 106 is formed at a lower part of the outer shell body 102. Also, a large diameter manhole 113 is formed at the upper surface of the outer shell body 102.

As an example of the filtration tank 101, as illustrated in FIG. 4, a plate 110, which is provided with strainers 114, is located within the outer shell body 102, and layers 108 of gravel 108a having large particle diameters are located at positions upward from the plate 110. Also, layers 112 of a filtration material 112a, such as sand having small particle diameters, are located on the layers 108 of the gravel 108a up to a level 112b. The unfiltered water is injected from the unfiltered water injection port 104, passes through the layers 112 of the filtration material 112a and the layers 108 of the gravel 108a within the filtration tank 101, and is thus filtrated. A cleaned liquid, from which the muddiness has been removed, passes through the strainers 114, and is supplied from the discharge port 106 to the outside.

In the cases of the filtration tank 101 constituted in the manner described above, wherein the opening section of the manhole 118 is comparatively large, as illustrated in FIG. 4, a discharge tube 50a and an introduction tube 38a may be inserted through the manhole 118, and the existing filtration tank 101 is thus capable of being used without being modified and altered.

How the filtration material 112a in the filtration tank 101 as cleaned after the filtration tank 101 and the cleaning device 1a have been installed in the manner described above will be described hereinbelow. At the time of the ordinary filtration, the height of the filtration material 112a coincides with a level 112b. At the time, at which the filtration is ceased, and the reverse cleaning is performed at the preliminary stage of the cleaning, the reverse cleaning liquid 122 expands and rises up to, for example, an opening 107a of an inside tube 107, which opening is located at a height indicated by a level 120. Specifically, in cases where the clearing liquid 122 is injected from the discharge port 106 for the reverse cleaning into the filtration tank 101, the reverse cleaning liquid passes through the strainers 114 and the layers 108 and is jetted out to the layers 112, and the filtration material 112a expands and flows. However, the filtration material 112a does not fly high up to the liquid surface of the reverse cleaning liquid 122 having expanded to the level 120 and flows at most up to a level 109, which is located at the position slightly higher than the level 112b. The liquid located at the positions lower than the level 109 constitutes a slurry (a suspension). Therefore, the filtration material 112a is distributed through the slurry, and the distribution density of the filtration material 112a becomes low. However, the muddiness having been peeled off by the reverse cleaning from the filtration material 112a is lighter than the filtration material 112a and therefore flows up to the level 120.

In the state described above, the motor 20 is actuated. In the cases of the application example described above, wherein the position of the screw conveyor 4' is higher than the position of the level 120 of the liquid surface of the reverse cleaning liquid 122, the reverse cleaning liquid 122 is not capable of being easily sucked into an outer tube 2' only by the rotation of the screw conveyor 4'. Therefore, it is necessary for the priming water to be injected from an injection tube 44'. The motor 20 as thereafter actuated, and the reverse cleaning liquid 122 and the filtration material 112a in the filtration rank 101 are capable of being easily introduced into the outer tube 2'.

The filtration material 112a having been introduced into the lower part of the outer tube 2' transferred upward while being rub-washed by the spiral blade 18 of the screw conveyor 4'. While the filtration material 112a is thus being transferred upward, the filtration material 112a is cleaned, and the muddiness is peeled off from the filtration material 112a. The filtration material 112a having thus been cleaned passes through the discharge tube 50a and is discharged into the filtration tank 101 together with the reverse cleaning liquid 122 containing the peeled-off muddiness. Since the filtration material 112a does not flow in the region between the level 109 and the level 120 of the slurry, only the reverse cleaning liquid 122 containing the muddiness flows out from the aforesaid inside tube 107. At this time, the reverse cleaning liquid 122 is continuously injected from the discharge port 106 into the filtration tank 101, and therefore the reverse cleaning liquid 122 containing the muddiness is continuously discharged from the aforesaid inside tube 107 to the outside. Therefore, the quantity of the muddiness contained in the reverse cleaning liquid 122 circulated within the filtration tank 101 and the cleaning device 1a decreases little by little. The control section 30 is operated in order to set the number of revolutions of the screw conveyor 4' at a value appropriate for the rub-washing. For example, in the cases of the screw conveyor 4' having a radius of 10 cm, the number of revolutions of the screw conveyer 4' should preferably be set such that the circumferential speed of the outer edge 18a of the screw conveyor 4' may become equal to at most 4 m/sec.

After the muddiness in the filtration tank 101 has been removed through iteration of the aforesaid process for a predetermined period of time, the introduction tube 18a and the discharge tube 50a are taken out. The ordinary filtration operation thus becomes capable of being performed. The cleaning device 1a may be ordinarily installed at a predetermined position in the vicinity of the filtration tank 101. Alternatively, only when necessary, the cleaning device 1a may be installed in the vicinity of the filtration tank 101. After the cleaning by the cleaning device 1a has been completed, the reverse cleaning may be continued for a certain period of time, and the muddiness in the reverse cleaning liquid may thereby be discharged.

A second application example of a further different embodiment of the cleaning device in accordance with the present invention will be described hereinbelow with reference to FIG. 5 and FIG. 6. FIG. 5 is a vertical sectional view showing a cleaning device. FIG. 6 is a schematic plan view showing a filtration tank, the view illustrating a position of a discharge tube located in a filtration tank 201. A cleaning device 1b illustrated in FIG. 5 has a constitution approximately identical with the constitution of the cleaning device 1 illustrated in FIG. 1, except for the position and the shape of a discharge tube 50b. Also, for clearness, the control section 30 is not illustrated. Further, a filtration tank 201 of a filtration device 200 is based upon a principle identical with the principle of the filtration tank 101. Therefore, only principal parts of the filtration tank 201 are explained, and detailed explanations of the filtration tank 201 are omitted. Furthermore, a screw conveyor 4" has the shape identical with the shape of the screw conveyor 4' illustrated in FIG. 4. In the cases of the second application example, slight reconstruction is necessary for the existing filtration tank 201. Reconstruction includes the provision of a fitting section 222 for the discharge tube 50b at an upper part of an outer shell body 202, and the provision of a fitting section 224 for an introduction tube 38b at an approximately middle part with respect to the height of the outer shell body 202. In the cases of the filtration tank 201, the liquid level at the time of the reverse cleaning coincides with the height indicated by 220 in FIG. 5. Also, the lower end section, i,e. the large diameter section 34, of the cleaning device 1b is connected to the fitting section 224 by the introduction tube 38b, which is approximately horizontal. Therefore, the region of an outer tube 2", which region extends from the middle point with respect to the height direction of the outer tube 2" to the part downward from the middle point, is located at the position lower than the level 220. Therefore, at the time of the reverse cleaning, the reverse cleaning liquid 122 enters from the introduction tube 38b up to the middle point of the outer tube 2". Accordingly, in the cases of the second application example, the priming water need not be used. As in the first application example, the actuation of the motor 28 is performed at the time of the reverse cleaning. In the cases of the filtration tank 201, the discharging of the reverse cleaning liquid 122 is performed through a horn-shaped inside tube 226, which communicates with the outside of the filtration tank 201.

As illustrated in FIG. 5 and FIG. 6, the length of the discharge tube 50b is set to be long. Also, as illustrated in FIG. 6, the discharge tube 50b is located so as to extend along the circumference of the inside of the filtration tank 201. In such cases, tine reverse cleaning liquid 122 discharged from the discharge tube 50b a flows out along the inner circumference of the filtration tank 201 as indicated by the arrows. By the stream of the reverse cleaning liquid 122, the filtration material 112a is agitated, the slurry uniformly containing the filtration material 112a is introduced into the introduction tube 38b, and the cleaning effect is enhanced even further.

In the application example illustrated in FIG. 5 and FIG. 6, the fitting section 222, at which the discharge tube 50b is located, takes the position on the side identical with the side of the fitting section 224, at which the introduction tube 38b is located. Alternatively, the fitting section 222, at which the discharge tube 50b is located, may take the position on the opposite side of the filtration tank 201, i.e. on the side remote from the fitting section 224, at which the introduction tube 38b is located. In such cases, tine filtration material 112a discharged from the discharge tube 50b enters into the filtration tank 201 from the position spaced away from the fitting section 224, and therefore the slurry having not been cleaned is easily introduced into the cleaning device 1b. The aforesaid feature is obtained also in the application example illustrated in FIG. 4 and in the application example, which will be described later. Also, the discharge tube 50b should preferably be made from a flexible material.

Figure 7:
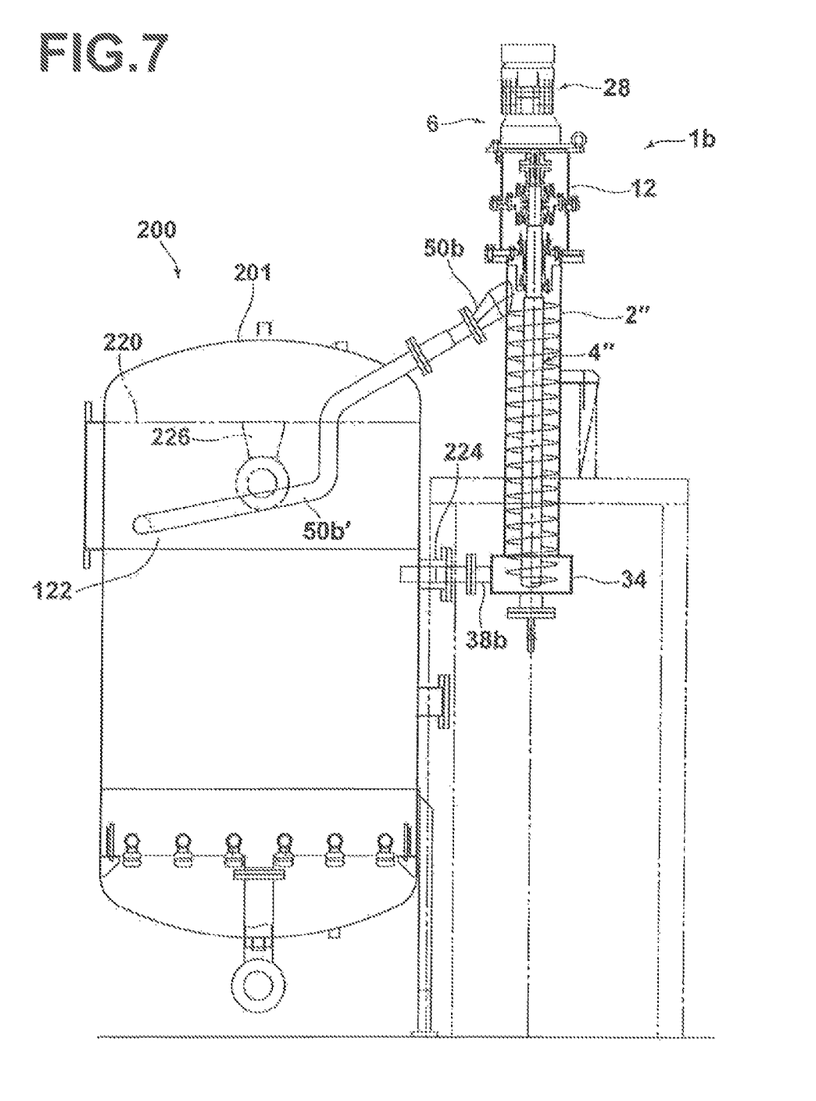
FIG. 7 is a vertical sectional view showing a modification of the application example illustrated in FIG. 3 and FIG. 6.
Figure 8:
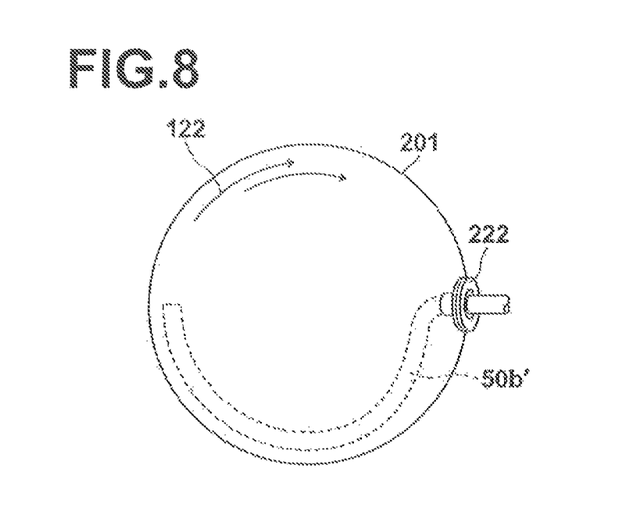
FIG. 8 is a schematic plan view showing a part of the modification of the application example illustrated in FIG. 5 and FIG. 6.

A modification of the application example illustrated in FIG. 5 and FIG. 6 will be described hereinbelow with reference to FIG. 7 and FIG. 8. In FIG. 7 and FIG. 8, similar elements are numbered with the same reference numerals with respect to FIG. 1 and FIG. 6, and detailed explanations of the similar elements are omitted. FIG. 7 is a vertical sectional view corresponding to FIG. 5, and FIG. 8 is a schematic plan view corresponding to FIG. 6. The modification varies in that a leading end section 50b' of the discharge tube 50b is constituted of a metal tube. Therefore, the leading end section 50b' is directly fitted to the filtration tank 201 by welding and is thus combined with the filtration tank into an integral body. The metal discharge tube 50b' is thus secured in the closed state to the filtration tank 201. Therefore, at the time at which the ordinary filtration is performed, the inside of the filtration tank 201 is capable of being filled with the unfiltered water without the discharge tube 50b being taken out, and the workability is thus capable of being kept good. Also, the advantages are obtained in that the service life of the discharge tube 50b' is long, and in that the position at which the discharge tube 50b' is installed does not alter.

Figure 9:
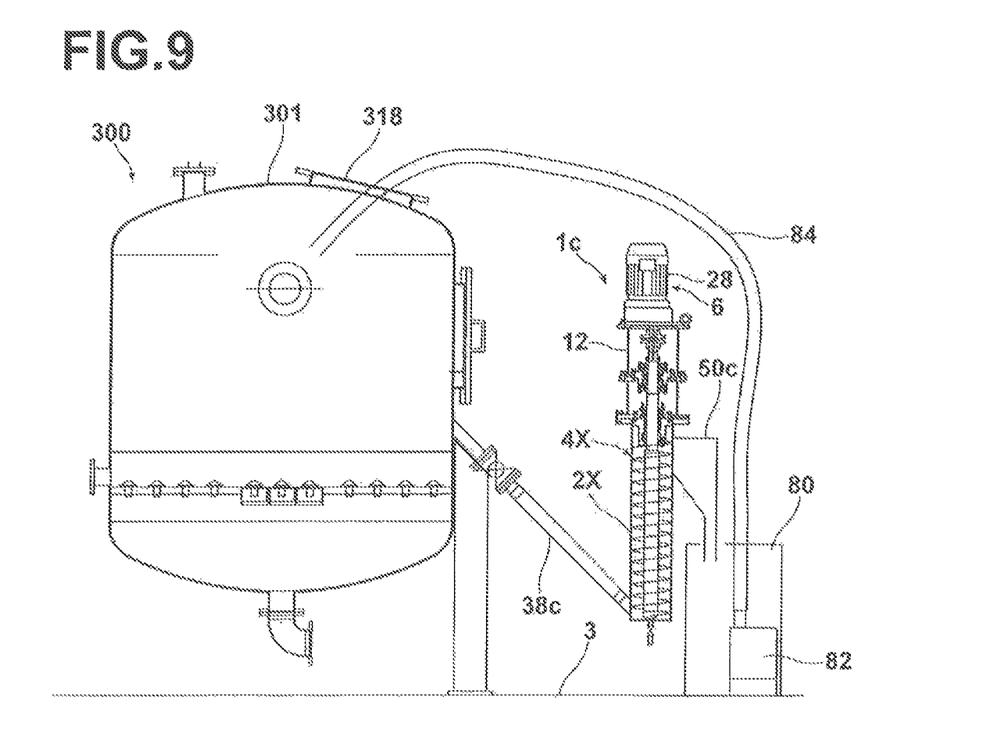
FIG. 9 is a vertical sectional view showing a third application example of a still further different embodiment of the external device for cleaning a filtration material and adapted for application to a filtration device in accordance with the present invention.

A third application example of a still further different embodiment of the cleaning device in accordance with the present invention will be described hereinbelow with reference to FIG. 9. In FIG. 9, for clearness, the control section 30 is not illustrated. Also, a screw conveyor 4X has a shape identical with the shape of the screw conveyor 4' illustrated in FIG. 4. In this application example, each that fine workability of the cleaning device, which is ordinarily located at a position higher than the filtration tank, may be enhanced, the cleaning device is located at a low position. A filtration tank 301 of a filtration device 300 used in this application example has a constitution approximately identical with the constitution of the filtration tank 101 used in the first application example, except for a slight modification. Specifically, the filtration tank 301 is modified such that an introduction tube 38c is fitted to a side surface of the filtration tank 301. A cleaning device 1c itself is located at a low position close to a floor 3. The introduction tube 38c is connected from the side surface of the filtration tank 301 to a lower end section of the cleaning device 1c and extends obliquely downward from the side surface toward the .lower end section. A discharge tube 50c is located downward from an tipper part of an outer tube 2X of the cleaning device 1c. The reverse cleaning liquid 122 containing the cleaned filtration material discharged, from the discharge tube 50c is stored in a filtration material storing container 80. The filtration material storing container 80 is provided with a filtration material pump 82. The filtration material having been stored is discharged by the filtration pump (sand pump) 82 through a hose 84, which acts as a discharge tube, into a manhole 318 of the filtration tank 301. In other words, in the third application example, the discharging is performed from the discharge tube 50c via the filtration material pump 82. This application example has the advantages in that, as described above, since all of the work is capable of being performed at the low position, the workability is kept good.

In each of the aforesaid embodiments and the aforesaid application examples, the cleaning device is constituted for the cleaning of the filtration sands. However, the object of the cleaning is not limited to the sands and may be, for example, other filtration materials, such as anthracite, activated carbon, and a mixture of the above-enumerated filtration materials. Also, as the liquid to be filtered, the explanation has been made with respect to water. However, the liquid to be filtered may be one of other liquids, such as an oil.

Further, in the third application example, the pump intervenes at the position midway of tine discharge tube 50c. Also, a pump for sucking the filtration material 112a, or the like, may intervene at a position midway of the introduction tube 38, 38a, or 38b.

INDUSTRIAL APPLICABILITY

The external device for cleaning a filtration material and adapted for application to a filtration device in accordance with the present invention is capable of being used by being applied to an existing filtration tank.

I claim:

1. A system comprising: a filtration device which is provided with a filtration container having layers of a granular filtration material at an inside of the container and is adapted for filtering a supplied unfiltered liquid by the layers of the filtration material to remove muddiness in the liquid for discharging the cleaned liquid to an outside of the container; and a cleaning device which is located outside of the filtration container for cleaning the filtration material of the filtration device, wherein the cleaning device comprises:

i) an outer tube,
   ii) a screw conveyor rotatably placed in the outer tube for transferring the filtration material upward from an inlet at a lower end section of the outer tube to an outlet at an upper end section of the outer tube, while rub-washing the filtration material,
   iii) a drive section for rotationally driving the screw conveyor,
   iv) a control section for controlling rotation of the drive section,
   v) an introduction tube, one end of which is connected to the inlet of the outer tube and the other end of which is located at the layers of the filtration material to introduce the filtration material from the inside of the filtration container into the outer tube by only suction force generated by the rotation of a screw of the screw conveyor, and
   vi) a discharge tube, one end of which is connected to the outlet of the outer tube and the other end of which is located at the layers to discharge the rub-washed filtration material to the inside of the filtration container by only discharge force generated by the rotation of the screw of the screw conveyor.

2. A system as defined in claim 1, wherein the filtration device comprises a reverse washing means which disperses and suspends the filtration material by introducing a reverse cleaning liquid from under the layers of the filtration material into the filtration container so that the filtration material is easily introduced into the outer tube, when the screw conveyor is driven to introduce the filtration material inside the filtration container into the outer tube.

3. A method cleaning a filtration material, utilizing a filtration material cleaning device, which takes out the filtration material from a filtration container having layers of the filtration material at the inside to clean the filtration material, and drops back the cleaned filtration material into the filtration container, wherein the filtration cleaning device is located outside of the filtration container and comprises: an upstanding outer tube; a screw conveyor rotatably placed in the outer tube and transferring the filtration material upward from an inlet at a lower end section of the outer tube to an outlet at an upper end section of the outer tube, while rub-washing the filtration material, v) an introduction tube, which is connected to the inlet of the outer tube to introduce the filtration material from the inside of the filtration container into the outer tube and vi) a discharge tube which is connected to the outlet of the outer tube to discharge the rub-washed filtration material to the inside of the filtration container from the outer tube, wherein the filtration material is suctioned to be introduced into the outer tube by only suction force generated by the rotation of a screw of the screw conveyor and the cleaned filtration material is pushed out to be discharged from the discharge tube to the filtration container by only discharge force generated by the rotation of the screw of the screw conveyor.

4. A method of cleaning filtration material as defined in claim 3, wherein the filtration material is dispersed and suspended in the filtration container by introducing a reverse cleaning liquid into the filtration container so that the filtration material is easily introduced into the outer tube when the screw conveyor is driven to introduce the filtration material inside the filtration container into the outer tube.

* * * * *